(12) United States Patent
Chen et al.

(10) Patent No.: US 10,567,625 B2
(45) Date of Patent: Feb. 18, 2020

(54) LENS MODULE WITH ENHANCED STABILITY

(71) Applicants: TRIPLE WIN TECHNOLOGY(SHENZHEN) CO. LTD., Shenzhen (CN); HON HAI PRECISION INDUSTRY CO., LTD., New Taipei (TW)

(72) Inventors: Shin-Wen Chen, New Taipei (TW); Xiao-Mei Ma, Guangdong (CN); Ke-Hua Fan, Shenzhen (CN); Long-Fei Zhang, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/116,102

(22) Filed: Aug. 29, 2018

(65) Prior Publication Data

US 2020/0007722 A1 Jan. 2, 2020

(30) Foreign Application Priority Data

Jun. 29, 2018 (CN) .......................... 2018 1 0700161

(51) Int. Cl.
*H04N 5/225* (2006.01)
*G02B 7/04* (2006.01)
*H04N 5/232* (2006.01)
*G02B 5/20* (2006.01)

(52) U.S. Cl.
CPC ............. *H04N 5/2254* (2013.01); *G02B 5/20* (2013.01); *G02B 7/04* (2013.01); *H04N 5/2253* (2013.01); *H04N 5/23248* (2013.01)

(58) Field of Classification Search
CPC ..................................................... H04N 5/2253
USPC ........................................................ 348/374
See application file for complete search history.

(56) References Cited

U.S. PATENT DOCUMENTS

| 7,166,907 | B2 * | 1/2007 | Onishi | .............. H01L 27/14618 |
| | | | | 257/434 |
| 7,609,461 | B1 * | 10/2009 | Webster | ................... G02B 7/02 |
| | | | | 359/811 |
| 2007/0091198 | A1 * | 4/2007 | Watanabe | ............ H04N 5/2254 |
| | | | | 348/340 |
| 2007/0159703 | A1 * | 7/2007 | Apel | ...................... G02B 7/021 |
| | | | | 359/819 |
| 2011/0037887 | A1 * | 2/2011 | Lee | .................... G02B 13/0035 |
| | | | | 348/340 |
| 2011/0063450 | A1 * | 3/2011 | Go | ........................ G03B 11/00 |
| | | | | 348/164 |

(Continued)

*Primary Examiner* — Anthony J Daniels
(74) *Attorney, Agent, or Firm* — ScienBiziP, P.C.

(57) ABSTRACT

A lens module with physically stronger foundations and enhanced stability includes a circuit board, an image sensor thereon, a mounting bracket, an optical filter, and a lens unit. The mounting bracket is connected to the surface of the circuit board which has the image sensor. The optical filter is connected to mounting bracket and positioned above the image sensor. The lens unit is connected to the mounting bracket facing away from the circuit board through a frame of adhesive. The surface of the lens unit connected to the mounting bracket has protrusions which are positioned at inner edges of the adhesive layer. The protrusions are taller than the depth of the adhesive layer.

10 Claims, 4 Drawing Sheets

(56) References Cited

U.S. PATENT DOCUMENTS

| | | | |
|---|---|---|---|
| 2012/0230670 A1* | 9/2012 | Hirooka | H01L 27/14618 396/529 |
| 2012/0257075 A1* | 10/2012 | Kamada | H01L 27/14618 348/222.1 |
| 2013/0128092 A1* | 5/2013 | Ogasahara | H04N 5/2254 348/335 |
| 2016/0037036 A1* | 2/2016 | Lim | H04N 5/2257 348/374 |
| 2016/0205300 A1* | 7/2016 | Busse | H04N 5/2253 348/374 |
| 2018/0013939 A1* | 1/2018 | Shigemitsu | G02B 7/02 |
| 2018/0231872 A1* | 8/2018 | Tahara | G02B 7/021 |
| 2019/0141224 A1* | 5/2019 | Park | H05K 1/144 |

* cited by examiner

LENS MODULE WITH ENHANCED STABILITY

FIELD

The subject matter relates to imaging devices, and more particularly, to a lens module.

BACKGROUND

Portable electronic devices, such as cell phones, tablet computers, and multimedia players, usually include lens modules. The lens module may comprise an image sensor glued to a circuit board, a mounting bracket defining a hollow space also glued to the circuit board and surrounding the image sensor, an optical filter glued to the mounting bracket and positioned above the image sensor, and a lens unit glued to the mounting bracket.

However, when a lateral pressure is applied to the lens module, the adhesive layer between the lens unit and the mounting bracket may distort and crack, causing the lens unit to separate from the mounting bracket. Furthermore, incoming light may enter the lens module through the adhesive layer between the lens unit and the mounting bracket, and be reflected by the optical filter, the electronic components, or the metallic wires in the lens module. The reflected light may affect images gathered by the image sensor. Thus, flares or stains may appear in images lowering the imaging quality.

Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
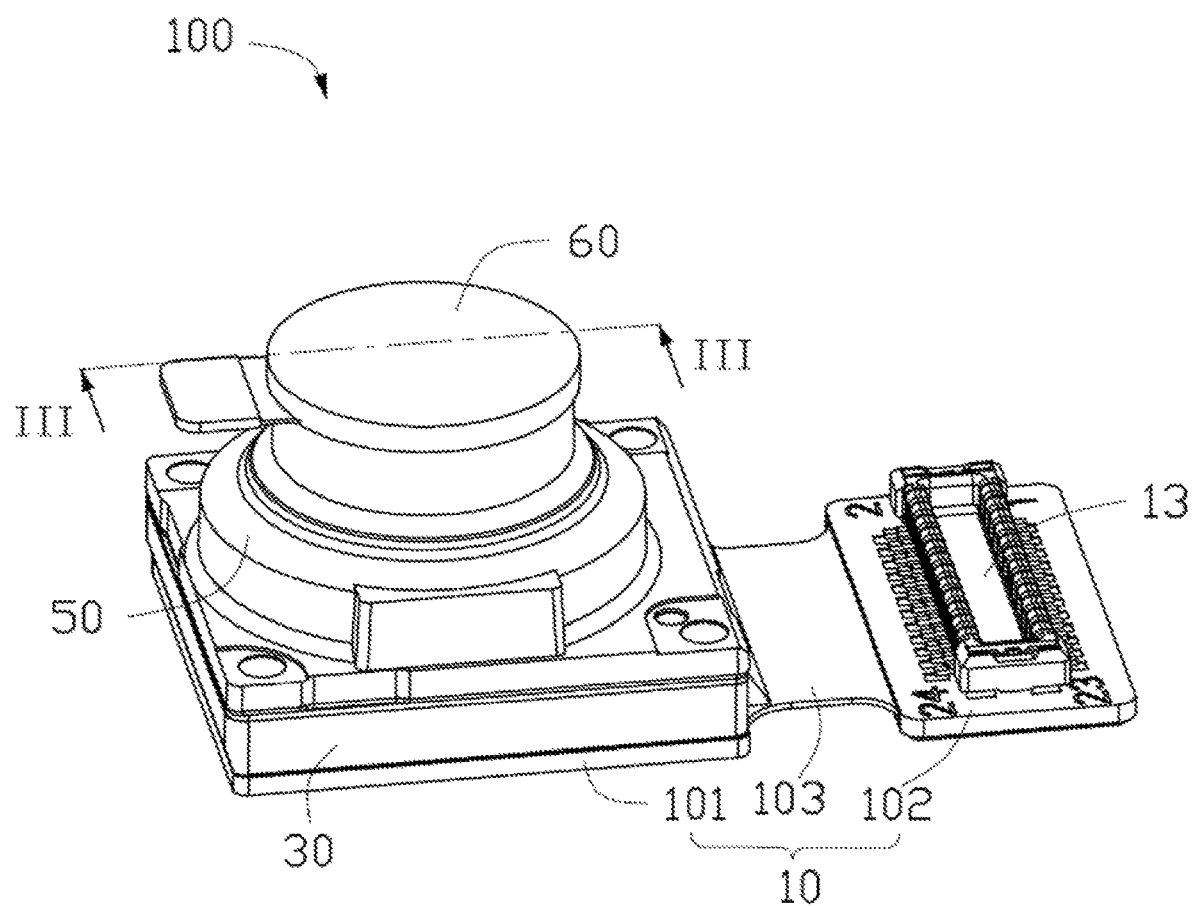
FIG. 1 is a diagrammatic view of an embodiment of a lens module.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
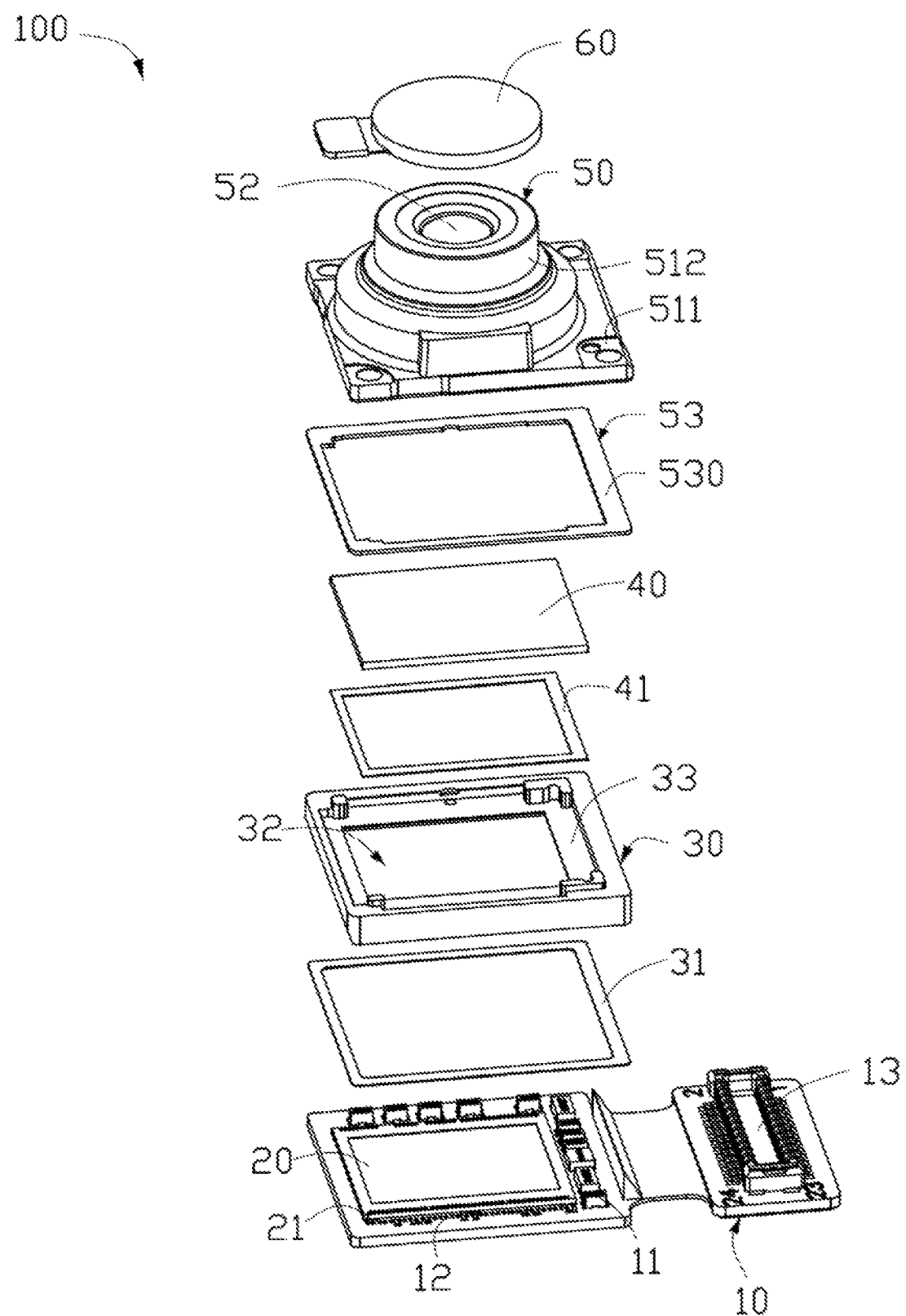
FIG. 2 is an exploded diagram of the lens module of FIG. 1.
Figure 3:
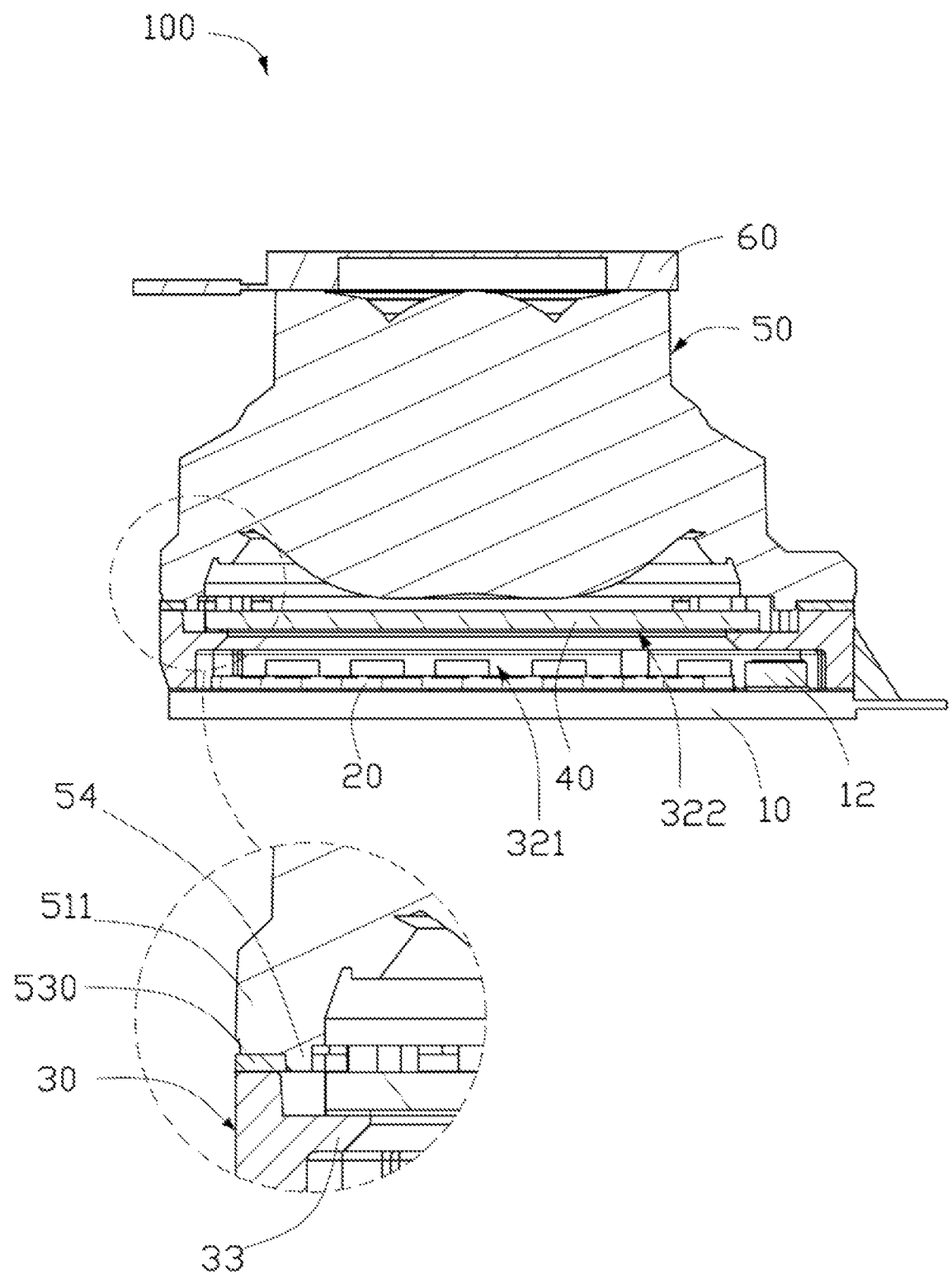
FIG. 3 is a cross-sectional view taken along line of FIG. 1.

FIGS. 1 to 3 illustrate an embodiment of a lens module 100. The lens module 100 can be used in an electronic device, such as a smart phone, a tablet computer, or a personal digital assistant (PDA). The lens module 100 comprises a circuit board 10, an image sensor 20, a mounting bracket 30, an optical filter 40, a lens unit 50, and a protecting cover 60.

The image sensor 20 is glued to a surface of the circuit board 10 through a first adhesive layer (not shown). The first adhesive layer can be made of optically clear adhesive (OCA). The circuit board 10 can be a rigid circuit board, a flexible circuit board, or a rigid-flexible circuit board. In an embodiment, the circuit board 10 is a rigid-flexible circuit board that comprises a first rigid board portion 101, a second rigid board portion 102, and a flexible board portion 103 positioned between and connecting together the first rigid board portion 101 and the second rigid board portion 102. The image sensor 20 is glued to a surface of the first rigid board portion 101.

Furthermore, the surface of the first rigid board portion 101 having the image sensor 20 further comprises electronic components 11 and gold fingers 12. The electronic components 11 and the gold fingers 12 may surround the image sensor 20. Metallic wires 21 can be arranged on edges of a surface of the image sensor 20 facing away from the circuit board 10. The metallic wires 21 match and are electrically connected to the gold fingers 12. In an embodiment, the image sensor 20 can be a Complementary Metal Oxide Semiconductor (CMOS) sensor or a Charge Coupled Device (CCD) sensor. The metallic wires 21 can be made of metal(s) having good conductivity, such as gold (Au). The electronic components 11 can be resistors, capacitors, diodes, triodes, relays, or electrically erasable programmable read only memories (EEPROMs).

The second rigid board portion 12 has an electronic connecting component 13 on one surface. The electronic connecting component 13, the electronic components 11, and the gold fingers 12 can be on the same surface of the circuit board 10. The electronic connecting component 13 can be a connector or gold fingers (edge connectors).

The mounting bracket 30 is glued to the surface of the circuit board 10 (for example, on the first rigid board portion 101) which has the image sensor 20 mounted thereon through a hollow second adhesive layer 31. The mounting bracket 30 is substantially square-shaped, and defines a receiving hole 32 that passes through the mounting bracket 30. The receiving hole 32 is wider than the image sensor 20, thereby allowing the image sensor 20 to be received in the receiving hole 32. In an embodiment, the electronic components 11 and the gold fingers 12 are also received in the receiving hole 32.

The optical filter 40 is positioned above the image sensor 20, and is glued to the mounting bracket 30 through a hollow third adhesive layer 41. In FIG. 3, a flange 33 is formed on an inner wall of the receiving hole 32. The flange 33 divides the receiving hole 32 into a first receiving space 321 facing the circuit board 10 and a second receiving space 322 opposite to the first receiving space 321. The image sensor 20 is received in the first receiving space 321. The optical filter 40 is received in the second receiving space 321, and is glued to and supported by the flange 33. A surface of the optical filter 40 facing away from the circuit board 10 is substantially flush with a surface of the mounting bracket 30 facing away from the circuit board. Thus, a total size of the lens module 100 can be decreased. Furthermore, the third adhesive layer 41 can be made of OCA. The optical filter 40 can be an IR cut-off filter that can remove infrared light from incoming light.

Figure 4:
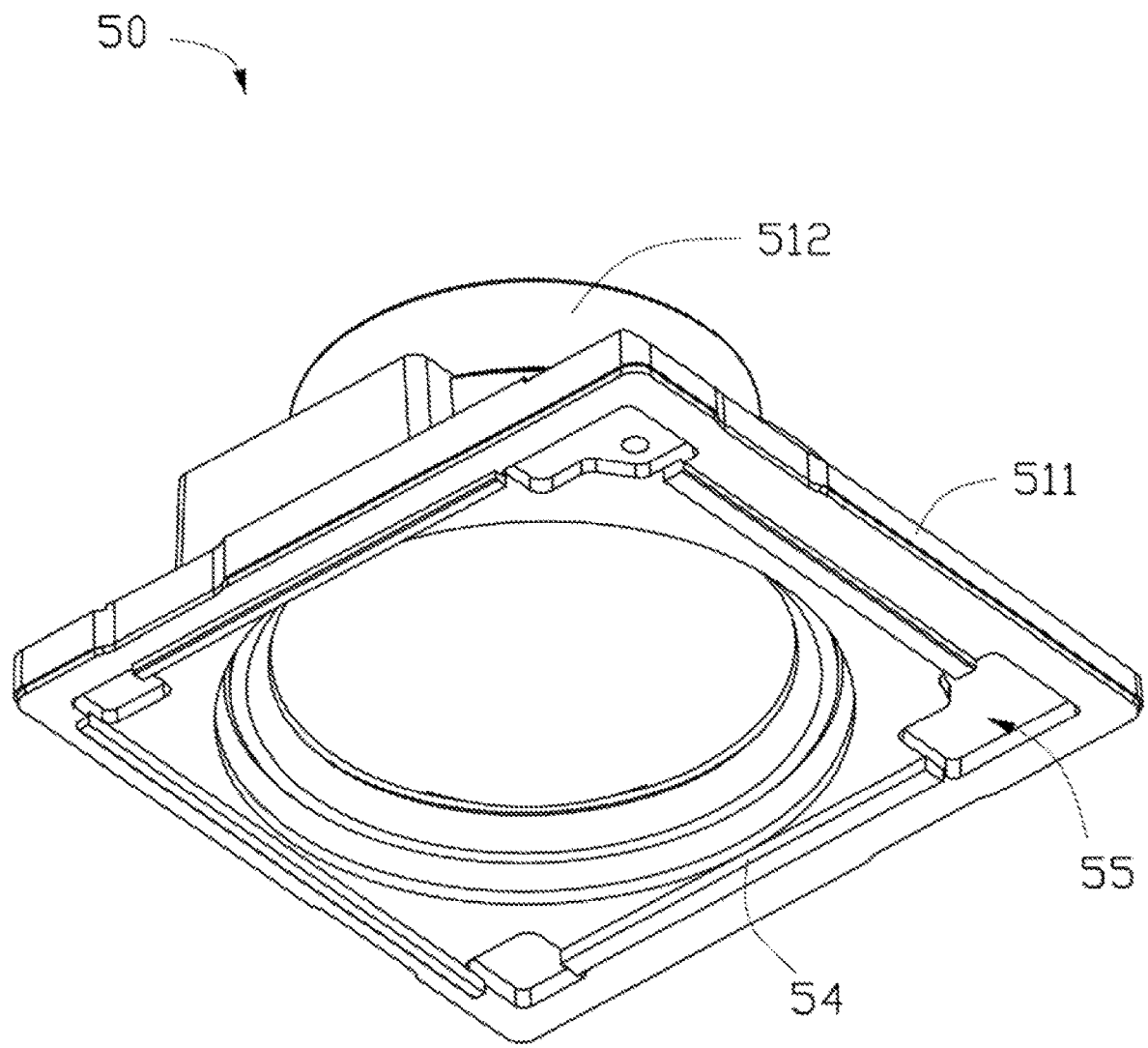
FIG. 4 is a diagrammatic view of a lens unit of the lens module of FIG. 1, from another angle.

The lens unit 50 is glued to the surface of the mounting bracket 30 facing away from the circuit board 10 through a fourth adhesive layer 53. In FIG. 4, a surface of the lens unit 50 connected to the mounting bracket 30 has at least two protrusions 54. The protrusions 54 are positioned at inner edge of the fourth adhesive layer 53. A vertical height of the protrusions 54 is greater than or equal to a vertical height of the fourth adhesive layer 53.

In an embodiment, the lens unit 50 comprises a lens holder 51 integrally formed with a lens 52. The lens holder 51 is glued to the mounting bracket 30. The lens 52 is positioned above the optical filter 40. The lens holder 51 and the lens 52 can be made of resin.

Furthermore, the lens holder 51 comprises a substantially square-shaped first holding portion 511 and a substantially circular-shaped second holding portion 512. The first holding portion 511 is glued to the mounting bracket 30. The second holding portion 512 is connected to a surface of the first holding portion 511 facing away from the mounting bracket 30. The shape of the first holding portion 511 matches the shape of the mounting bracket 30. The fourth adhesive layer 53 is also hollow and substantially square-shaped, and comprises four sides 530 connected end-to-end. The number of the protrusions 54 is four, and are parallel to four edges of the surface of the first holding portion 511 connected to the mounting bracket 30. The protrusions 54 contact and abut against inner edges of the sides 530 of the fourth adhesive layer 53.

Furthermore, at the corners of the surface of the first holding portion 511 connected to the mounting bracket 30, a recess 55 is formed at the corner. The recesses 55 contribute to decreasing the total weight of the lens module 100.

The protecting cover 60 covers the lens unit 50.

In use, the optical filter 40 removes infrared light. The image sensor 20 converts the light it receives to electrical signals, and outputs the electrical signals to the circuit board 10. The circuit board 10 processes the electrical signals to form digital images. The lens module 100 can be mounted to other components (not shown) of the electronic device through the electronic connecting component 13.

With the above configuration, the surface of the lens unit 50 connected to the mounting bracket 30 has at least two protrusions 54. The protrusions 54 block light that would otherwise pass through the fourth adhesive layer 53. Thus, flares or defects in the image can be prevented. Furthermore, when a lateral pressure is applied to the lens module 100, the protrusions 54 prevent rocking that causes distortions and cracks in the fourth adhesive layer 53. Thus, the chance of separation of the lens unit 50 and the mounting bracket 30 is reduced. Without protrusions 54, the gluing area of the lens unit 50 depends on the surface area of the fourth adhesive layer 53. Adding protrusions 54 increases the available gluing area of the lens unit 50, thereby improving the bonding strength between the lens unit 50 and the mounting bracket 30.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A lens module comprising:
   a circuit board;
   an image sensor connected to a surface of the circuit board;
   a mounting bracket defining a receiving hole, the mounting bracket being connected to the surface of the circuit board, which has the image sensor connected thereto, the image sensor received in the receiving hole of the mounting bracket;
   an optical filter connected to the mounting bracket and positioned above the image sensor; and
   a lens unit connected to a surface of the mounting bracket facing away from the circuit board through a hollow adhesive layer, a surface of the lens unit connected to the mounting bracket having at least two protrusions, the protrusions positioned at an inner edge of the adhesive layer, wherein a vertical height of the protrusions is greater than or equal to a vertical height of the adhesive layer,
   wherein the lens unit comprises a lens holder integrally formed with a lens, the lens holder is connected to the mounting bracket, the lens is positioned above the optical filter, the lens holder comprises a square-shaped first holding portion and a circular-shaped second holding portion, the first holding portion is connected to the mounting bracket, the second holding portion is connected to a surface of the first holding portion facing away from the mounting bracket, the adhesive layer is square and comprises four sides connected end-to-end, the protrusions number four, each protrusion is parallel to one edge of the surface of the first holding portion connected to the mounting bracket, the protrusions contact and abut against inner edges of the four sides of the adhesive layer.

2. The lens module of claim 1, wherein a recess is formed at each corner of a plurality of corners of the surface of the first holding portion connected to the mounting bracket.

3. The lens module of claim 1, wherein the circuit board is a rigid-flexible circuit board that comprises a first rigid board portion, a second rigid board portion, and a flexible board portion positioned between and connecting together the first rigid board portion and the second rigid board portion, the image sensor is connected to a surface of the first rigid board portion.

4. The lens module of claim 3, wherein the surface of the first rigid board portion having the image sensor further comprises electronic components and gold fingers, the electronic components and the gold fingers surround the image sensor, metallic wires are arranged on edges of a surface of the image sensor facing away from the circuit board, the metallic wires match and are electrically connected to the gold fingers.

5. The lens module of claim 3, wherein the second rigid board portion has an electronic connecting component on one surface.

6. The lens module of claim 1, wherein the receiving hole passes through the mounting bracket, the receiving hole is wider than the image sensor.

7. The lens module of claim 6, wherein a flange is formed on an inner wall of the receiving hole, the flange divides the receiving hole into a first receiving space facing the circuit board and a second receiving space opposite to the first receiving space, the image sensor is received in the first receiving space, the optical filter is received in the second receiving space and is connected to and supported by the flange.

8. The lens module of claim 7, wherein a surface of the optical filter facing away from the circuit board is flush with a surface of the mounting bracket facing away from the circuit board.

9. The lens module of claim 1, further comprising a protecting cover covering the lens unit.

10. A lens module comprising:
- a circuit board;
- an image sensor connected to a surface of the circuit board;
- a mounting bracket defining a receiving hole and four protrusions, the mounting bracket being connected to the surface of the circuit board, and the image sensor being received in the receiving hole of the mounting bracket;
- an optical filter connected to the mounting bracket and positioned above the image sensor; and
- a lens unit connected to a surface of the mounting bracket facing away from the circuit board through a hollow adhesive layer, a surface of the lens unit being connected to each of the four protrusions of the mounting bracket, the four protrusions being positioned at an inner edge of the adhesive layer, a vertical height of each of the four protrusions being greater than or equal to a vertical height of the adhesive layer, wherein the lens unit comprises a lens holder connected to the mounting bracket, the lens holder comprises a first holding portion and a second holding portion, the first holding portion is square shaped and connected to the mounting bracket, the second holding portion is circular shaped and is connected to a surface of the first holding portion facing away from the mounting bracket, the adhesive layer is square shaped and comprises four sides connected end-to-end, each of the four protrusions is parallel to one edge of the surface of the first holding portion connected to the mounting bracket, the protrusions contact and abut against inner edges of the four sides of the adhesive layer.

\* \* \* \* \*